United States Patent

[11] 3,547,383

[72] Inventor Willard D. Carpenter, Jr.
New York, N.Y. (6669 Oakridge Road, San Diego CA)
[21] Appl. No. 786,798
[22] Filed Nov. 26, 1968
[45] Patented Dec. 15, 1970

[54] VELOCITY/ALTITUDE SENSING AUTOMATIC PARACHUTE RELEASE
15 Claims, 7 Drawing Figs.
[52] U.S. Cl. .................................................. 244/150
[51] Int. Cl. ...................................................... B64d 17/56
[50] Field of Search ........................................... 244/150, 147, 142

[56] References Cited
UNITED STATES PATENTS
2,175,634 10/1939 McQuillen ..................... 244/150
2,505,869 5/1950 Quilter ........................... 244/150
2,812,148 11/1957 Fogal et al. ..................... 244/150
3,112,091 11/1963 Snyder ............................ 244/150

Primary Examiner—Milton Buchler
Assistant Examiner—James E. Pittenger
Attorney—Matthew M. Russo ABSTRACT: A parachute release device having an altitude sensing mechanism for initially setting and arming a decision making means at a preset first altitude. Said sensing mechanism thereafter providing a second signal to said decision means at a second preset altitude. A parachute release apparatus operably connected to receive an activating input from said decision means only when the time differential between said initial and said second signal is less than a selected time interval. Whereby, said release apparatus will only deploy said parachute if the rate of descent is indicative of a malfunction or failure of the main parachute to deploy. Additionally, there is provided means for calibrating and adjusting said sensing mechanism and an indication of any inoperativeness on the part of the entire device.

INVENTOR.
WILLARD D. CARPENTER, JR.

PRESSURE SENSING — DECISION MEANS — RELEASE MECHANISM

PRESSURE SENSING MEANS — DECISION MEANS — RELEASE MEANS

INVENTOR.
WILLARD D. CARPENTER, Jr.

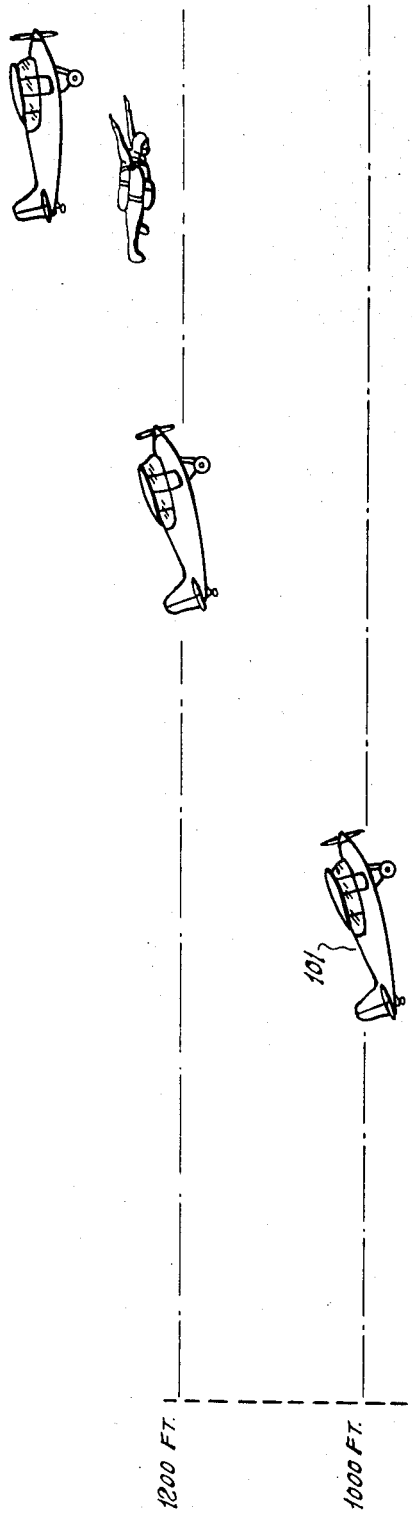

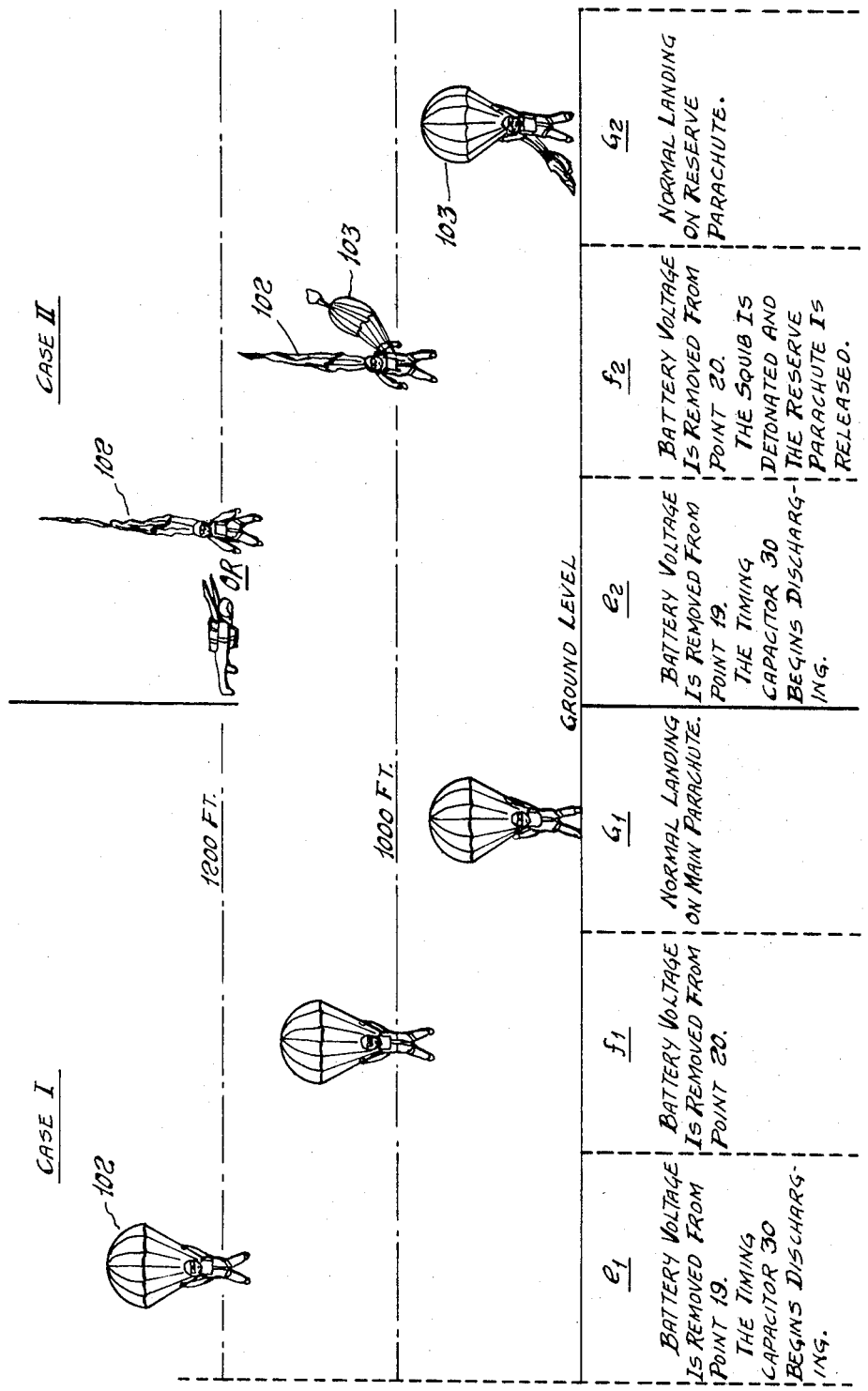

3,547,383

VELOCITY/ALTITUDE SENSING AUTOMATIC PARACHUTE RELEASE

BACKGROUND OF THE INVENTION

1. Field of the Invention

The present invention generally relates to improvements in parachute deployment, and more particularly pertains to new and improved automatic parachute deployment, wherein, the parachute is activated and opened by a device which senses two successive barometric pressures and the time period therebetween. These parameters must occur in a selected order and within a preselected period.

2. Description of the Prior Art

In the field of automatic parachute openers it has been the general practice to employ release mechanisms which must be armed for activation just prior to the chutists leaving the aircraft and must thereafter be manually disarmed when the necessity therefor no longer exists. These devices are commonly operated upon the principle of relative barometric pressure and are usually, though not necessarily, applied to a secondary or reserve parachute. In operation, as for example, a sport parachutist will equip himself with a main and a reserve parachute. Upon jumping he will arm or activate the automatic ripcord release mechanism of his reserve parachute so that in the event his manually operated main chute fails to deploy for any reason, his reserve parachute will be released automatically when he descends to a preselected altitude. Thus, if the chutist himself is unable to make the decision relating to the release of the reserve parachute, it will be discharged automatically. This safety apparatus at first observation appears to satisfy all the requirements for providing a foolproof backup system. There are, however, several critical drawbacks which become readily apparent upon closer analysis. First, the parachutist must manually arm the release mechanism before jumping. He must thereafter deploy his main chute and should he fail to do so or should the chute malfunction his reserve chute will be activated at the preset altitude. However, it should be borne in mind that if his main chute is operative he must manually disarm the automatic release mechanism. Otherwise it will of its own operation deploy his reserve chute and he will descent hazardously under two canopies. In other words, the chutist must remember to disarm the reserve chute. Certain conditions, such as physical inability, forgetfulness due to panic or stress, might endanger the safety of the parachutist by the initial use of a safety or reserve chute. Essentially, the requirement of two positive actions on the part of the user has been obviated by the present invention in that the rate or velocity of descent is employed to automatically deploy the reserve chute without the intersecession of the user.

SUMMARY OF THE INVENTION

The general purpose of this invention is to provide an automatic ripcord release device that has all the advantages of similarly employed prior art devices and has none of the above-mentioned inherent disadvantages. To attain this, the present invention provides a unique arrangement of a pressure/altitude sensing means for developing a pair of outputs, one each at two preselected altitudes. A timing/decision electronic means stores the first signal and if the second signal arrives before a specified time interval, fires the ripcord and deploys the reserve parachute. In the alternative, if the time period is exceeded, then the device is automatically inactivated. Thus, the decision to deploy is directly dependent on the chutists rate of descent (pressure/altitude vs. time).

An object of the present invention is to provide a fully automatic parachute opening device whose activation is directly dependent on the rate of descent of the user.

Another object is to provide a simple, inexpensive, reliable and adjustable electronically controlled parachute deploying device.

Still another object is to provide a parachute opening device which is self-arming and which need not be subsequently disarmed by the user and which is adapted for use with presently commercially available ripcords.

Other objects and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 5 (A & B) is a pictorial representation of the sequence of operations wherein the device of this invention is employed.

DESCRIPTION OF THE PREFERRED EMBODIMENT

Figure 1:
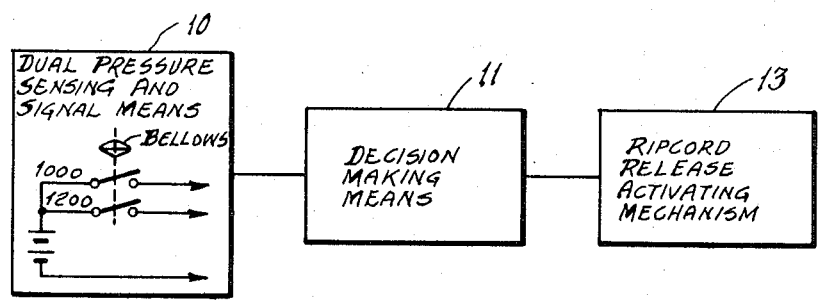
FIG. 1 is a block diagram of the basic functional means embodying the principle of the present invention.

FIG. 1, which illustrates in overall block form the basic components of the preferred embodiments, shows a dual pressure sensing and signal means 10 which detects or senses two different barometric pressures and provides an output for each thereof. Since the device is worn by a parachutist, these barometric pressures correspond to specific altitudes as, therefore, do the two signal outputs. The output signals are applied to a decision making means 11 which senses the sequential order of the altitude signals and the time duration therebetween. If these signals are received so that the higher altitude preceeds the lower altitude by a period which corresponds to a selected rate of descent based on the difference in altitude, a decision signal will be generated which then activates the ripcord release mechanism 13 to deploy the parachute.

Figure 2:
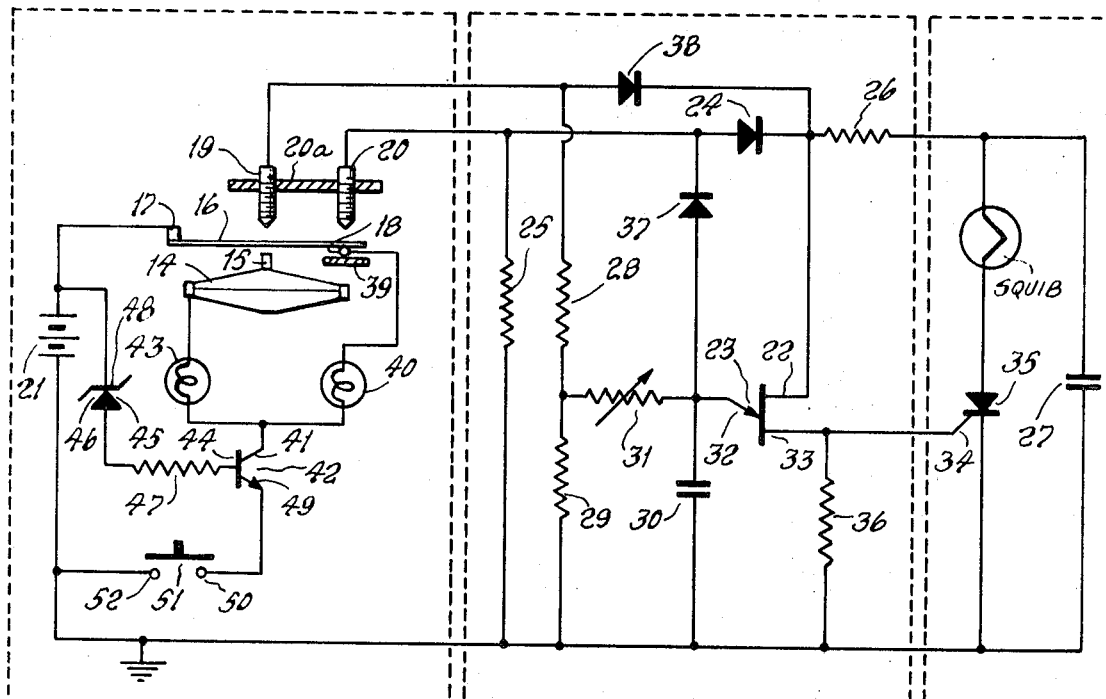
FIG. 2 is a circuit diagram of a preferred embodiment made in accordance with the principles of this invention.

In the illustrated embodiment of FIG. 2, an aneroid bellows 14 is supported (structure not shown) so that its deflecting or expanding portion which carries an operating end portion 15 is directed upwardly toward metallic contact arm 16 which is pivoted about 17 and is biased downwardly so as to normally remain in contact with stationary contact 18. Supported directly above and in the travel path of the arm 16 are a pair of adjustable contacts 19 and 20. They are supported by any suitable means, such as block 20a, and are selectively adjustable toward and away from the arm 16 while being biased downwardly. This permits the contact arm 16 to first abut one of these (lower) and then contact the other simultaneously as the bellows expands. The same result would be attained if the contact arm 16 were flexible, as a spring. A pair of independent sign single pole switches could replace the single arm 16. For the sake of clarity and explanation, contact 20 is adjusted so as to contact the arm 16 when the bellows has expanded to the barometric pressure equivalent to 1,000 feet above ground level and contact 19 is adjusted for contact at 1,200 feet AGL.

Contact arm 16 is electrically connected via its pivot 17 to an electrical energy source such as battery 21, whose opposite end is grounded. As the bellows 14 expands with increased altitude, arm 16 abuts contact 20 and the battery voltage V is applied to terminal 22 of unijunction transistor 23 through unidirectional diode 24. This voltage also appears across input resistor 25 and effectively terminal 22 is clamped to the battery voltage V. Battery current also flows through resistor 26, causes capacitor 27, to be charged thereby to voltage V.

Further movement of arm 16 under the expanding action of the bellows simultaneously applies the battery voltage V to contact 19 and thus across the voltage divider network comprising series resistors 28 and 29. The voltage at the junction of these two resistors is a function of their respective values and the battery voltage V namely, $\left(\dfrac{R29}{R28+R29}\right)$ V. Thus the capacitor 30 can only attain a voltage less than V while dependent upon the selection of the divider network. The charge rate or time constant is adjusted by variable resistor 31 which forms part of the charging circuit loop. The voltage at capacitor 30 is also connected directly to the emitter terminal 32 of the unijunction transistor 23. Since a unijunction transistor will not conduct unless the emitter voltage exceeds a fraction N (intrinsic stand off ratio) of the voltage between the ohmic contact terminals base-one (B1) 33 and base-two (B2) 22. When Ve (Voltage at emitter) is greater than $NV_{BB}$ then the resistance between the emitter and B, decreases and current flows from the emitter to B1. This terminal 33 B1 is connected to the gate 3 4 of Silicon Controlled Rectifier 35 and, without a gate potential the SCR will remain nonconducting or in the "off" state. This SCR 35 is disposed in series with a Squib and this series combination is across or in parallel with capacitor 27. A "Squib" is a term applied to an electrically detonated explosive charge. Presently available parachute ripcord handles are provided with such Squibs and when detonated they instantly release the parachute ripcord thus deploying the parachute without any further intervention on the part of the user. The state or condition of the electronic circuitry described thus far is the result of the ascent from ground level to above 1,200 feet AGL of a parachutist having attached to his reserve chute (for automatic deployment) the electronic device of this invention. This is pictorially represented in FIGS. 5 a through d with the chutist jumping somewhat above 1,200 feet AGL and the system armed.

There are presently available unijunction transistors which are programmable. They are also known a as PUT and are three terminal planar passivated PNPN devices. Their basic advantage in addition to simplicity of circuit use, is that they can be used in place of conventional unijunctions but the user can select his resistors to program the characteristics N, $R_{BB}$, $I_p$ and Iv to meet his particular requirements. The PUT is fully described in the General Electric "Electronic Innovations——Semiconductors" published Nov. 1967 and numbered 60.20.

When the chutist descends to 1,200 feet AGL the bellows contracts and the arm 16 is disconnected from terminal 19 thereby removing the battery voltage V from the voltage divider (resistors 28, 29) and from capacitor 30. This capacitor then proceeds to discharge through variable resistor 31 and resistor 29. All other voltages are unaffected since terminal 20 maintains voltage V and also maintains capacitor 27 charged. At sometime thereafter the chutist has descended to 1,000 feet AGL thus causing arm 16 to disconnect from terminal 20 which results in the immediate loss of battery voltage V across capacitor 27. The capacitor has charged to V and this potential is now across the combination of resistor 26 and the resistance between $B_1$ (33) and $B_2$ (22) of the unijunction transistor 23 or $R_{B_1B_2}$. The resistance of shunt resistor 36 which is comparatively negligible and is neglected. The shunt resistor is employed to prevent the leakage current through the unijunction transistor 23 from turning or gating the SCR 35 to its "on" state. Thus, the voltage at terminal 22($B_2$) or effectively $V_{B_1B_2}$ becomes $(R_{B_1B_2}/R_{26}R_{B_1B_2})Vc$ 27. If, at this instant, the voltage Vc30 across capacitor 30 a (at emitter 32) is less than $NV_{B_1B_2}$ then the unijunction transistor 23 will not conduct and SCR 35 will remain " off" With terminal 20 open, capacitor 30 will not continue to discharge through the path consisting of diode 37 and resistor 25 causing the circuit to be effectively disarmed. At the same time capacitor 27 is discharged through resistor 26 and the ohmic contacts of the unijunction transistor. It is quite clear that the "decision" whether the SCR was gated "on" depended entirely on the voltage across capacitor 30 which is trolled by variable resistor 31). In other words, by selecting the time constant to be such that the SCR would not fire after a certain elapsed time period from the opening of terminal 19 (1,200 feet AGL) to the opening of terminal 20 (1,000 feet AGL), the unit is disarmed. This time period is selected based on the rate of descent of the parachutist such that if his chute opens and is deployed properly he will exceed this period in his descent from 1,200 to 1,000 feet AGL. Since resistor 31 is variable and terminals 19 and 20 can be adjusted for other altitudes, the altitudes employed have been selected merely for illustrative purposes.

Considering now the situation illustrated in FIGS. 5(e2—g2) where the parachutists' main chute either fails to operate or is deployed improperly, the system is again in the armed condition when he jumps. Terminal 19 has opened at 1,200 feet AGL and very shortly thereafter terminal 20 opens. Since the time period between these terminal openings is quite small, the voltage Vc30 across timing capacitor 30 has not diminished appreciably due to discharge. At this instant, this voltage Vc30 exceeds $NV_{B_2B_1}$ and the unijunction transistor conducts turning or gating SCR 35 "on" since the timing capacitor 30 now discharges through the emitter 32, base-one (B1) and resistor 36 and thereby applies a gate pulse at the gate 34 of the SCR. With SCR 35 now turned "on" and presenting a low resistance, capacitor 27 discharges through the "Squib," detonating it and releasing the ripcord and deploying the reserve chute.

Diode 38 is effective in electrically isolating the capacitor 27 from the timing circuit comprising resistors 29 and 31 and the capacitor 30. Diode 24 is employed as a safety device. Should the voltage at terminal 20 (1,000 feet) be lost or disabled due to shock, vibration or malfunction prior to opening of terminal 19 (1,200 feet) then, firing would be prevented. It should be noted that the entire electronic operation is dependent on the opening of terminals or the removal of voltage. This form of selective operation or mode permits the most reliable physical operation of the bellows/switch combination.

Consider now the calibration circuitry of FIG. 2. Of paramount concern to a parachutist is altitude, in terms of feet Above Ground Level (AGL), and not altitude based on a device such as an aneroid bellows which is sensitive to atmospheric pressure, a factor, which does not remain constant. It is therefore absolutely necessary to physically position the bellows at a specific point prior to each jump ascent. For this purpose, a stationary contact 18 is supported by member 39 below the arm 16 and electrically connected to lamp 40 which in turn is connected to the collector 41 of transistor 42. The operating end 15 of the bellows is electrically in circuit with a second lamp 43 that has its opposite end tied to the collector 41. The base 44 of the transistor 42 is connected to the anode 45 of Zener diode 46 via base resistor 47 while its cathode 48 is connected to the positive terminal of battery 21. The emitter 49 is connected to one contact 50 of normally open switch 51 while its other contact 52 is applied to the negative terminal of the battery. Calibration is performed at Ground Level by first closing switch 51 and observing the condition of lamps 40 and 43. Under the physical conditions illustrated, with the arm 16 abutting contact 18, lamp 40 will be lighted. If it should fail to light then the bellows, which is movable toward or away from the arm 16, must be moved downwardly or away so as to permit arm 16 to rest on contact 18. Lamp 40 lighting circuit path consists of battery positive, arm 16, contact 18, the lamp, collector 41, emitter 49, switch 51 and the battery negative. When the bellows is lowered the lamp 40 will light since Zener 46 is made to conduct and the base resistor 47 voltage at transistor 42 places it in the conducting state thus effectively lowering the resistance between the emitter 49 and the collector 41. Alternately, if lamp 43 fails to light the bellows must be raised until this lamp 43 is lighted. For proper calibration both lamps must be lighted simultaneously. If both lamps fail to light then it is clear that the Zener diode 46 has failed to conduct due to low battery voltage. Thus, failure of both lamps to light serves as a direct battery voltage level check.

Figure 3:
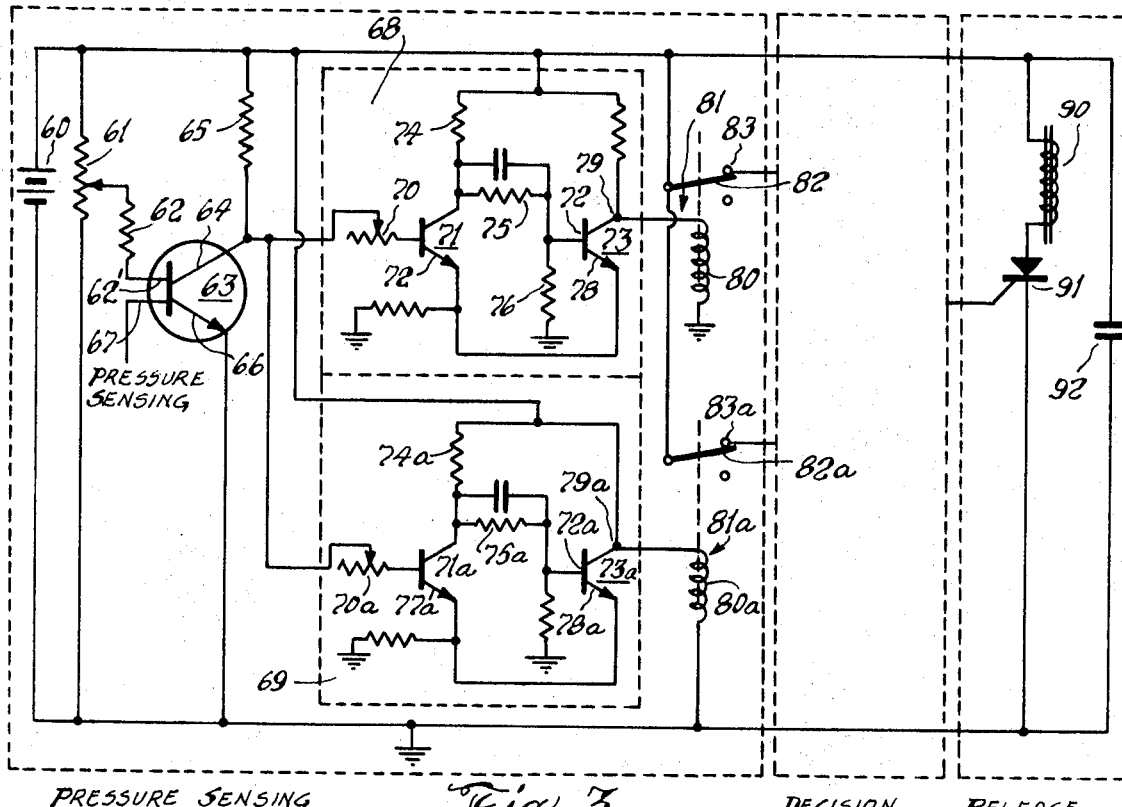
FIG. 3 is a circuit diagram of another embodiment made in accordance with the principles of this invention employing operational means different from those of FIG. 2.

In the illustrated embodiment of FIG. 3, different elements and components have been employed to perform the operational functions. The battery 60 is across a variable resistor 61 which in conjunction with fixed resistor 62 supplies an adjustable bias voltage to the base 62 of a pressure sensitive transistor 63 whose collector 64 is connected to B+via resistor 65 and whose emitter 66 is grounded. The sensitive or measuring terminal contact 67 is indicated as shown. When this transistor is mounted with one of faces exposed to some reference pressure e.g. sealed plenum) and the other face exposed to the atmosphere, the voltage at the collector 64 will be proportioned to the atmospheric pressure. Transistors of this variety are commercially available and one such unit is manufactured by Stow Laboratories, Inc. of Stow, Mass. ad and fully described in their publication "Pitran-PT-2/PT-3" dated Dec. 1967. The output (collector 64) of the pressure sensitive transistor 63 is applied to the inputs of a pair of identical Schmitt trigger circuits 68 and 69.

A Schmitt trigger is a regenerative bistable circuit whose state depends on the amplitude of the input voltage which is applied through a variable input resistor 70. Assuming that transistor 71 is nonconducting, the base 72 of transistor 73 is biased to some voltage by the voltage divider consisting of resistors 74, 75 and 76. The emitters 77 and 78 of both transistors are at some voltage, slightly less than that of the base bias, due to the forward bias voltage required by transistor 73. If the input voltage is less than the emitter voltage, transistor 71 is "off." As the input voltage approaches the emitter voltage, a critical potential is attained where transistor 71 begins to conduct and regeneratively turns "off" transistor 73 thus raising the potential at the collector 79 and supplying an output current through the coil 80 of relay 81. With relay 81 energized the normally closed switch 82 is thrown into its open position and voltage from battery 60 removed from upper contact 83. By adjusting the input resistors or selecting the values of the other components each Schmitt trigger can be made to fire at a selected potential.

Considering a chutist who is above 1,200 feet AGL and is descending, the voltage at the Schmitt triggers input will be low and neither relay energized. When he reaches 1,200 feet AGL Schmitt trigger 69 reaches its firing potential and battery voltage is removed from contact 83a. Further descent to 1,000 feet AGL results in Schmitt trigger 68 firing and thereby energizing relay 81 removing battery voltage from contact 83.

Thus it is clear that the contacts 83 and 83a correspond to contacts 20 and 19 of FIG. 2 which are applied to the decision means which in this case could be identical to that of FIG. 2 and has therefore been deleted.

Figure 4:
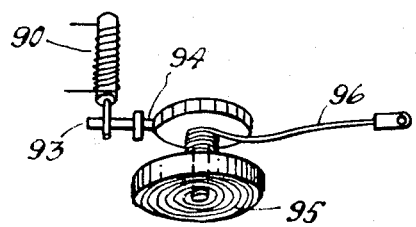
FIG. 4 is a perspective view of a ripcord release mechanism employing the solenoid of FIG. 3.

The release mechanism in this embodiment consists of a solenoid whose winding 90 is connected in series with SCR 91 so that as aforedescribed for FIG. 2, this SCR 91 will only be fired when the chutist has descended from 1,200 feet AGL to 1,000 feet within a specified time period. This firing of SCR 91 will result in capacitor 92 being discharged through the solenoid and activating the solenoid trip 93 shown in FIG. 4. This result releases the locking mechanism 94 which has been restraining coiled spring 95 and thereupon the spring uncoils and pulls the ripcord cable to which it is coupled, deploying the reserve chute.

Referring now to !FIG. 5 and starting with 5a the chutist 100 at ground level, calibrates his device to the atmospheric pressure at ground level and simultaneously checks his battery level. As the chutist ascends in airplane 101 and attains an altitude of 1,000 feet AGL battery voltage is applied to contact 20 (FIG. 2) thus commencing the charging of capacitor 27 toward its steady state value. When the aircraft has reached 1,200 feet AGL, FIG. 5c battery voltage is applied to contact 19 and timing capacitor 30 starts to charge toward its steady state resulting in an armed device as at FIG. 5c battery voltage is applied to contact 19 and timing capacitor 30 starts to charge toward its steady state resulting in an armed device as at FIG. 5d where the chutist jumps.

Two possibilities now exist either as illustrated in FIG. 5e to g, the main chute 102 deploys properly or it malfunctions as in FIGS. 5e2 to g2. Considering case 1, at 1,200 feet AGL battery voltage is removed from contact 19 and timing capacitor 30 starts to discharge. At 1,000 feet AGL battery voltage is removed from contact 20 but since the rate of descent was slow the unijunction 23 did not fire SCR 35 and the Squib was not detonated as explained hereinbefore. Thus, the unit is disarmed and the chutist descends in a normal manner. The same result would ensue if the chutist failed to jump and descends in the airplane.

Under the conditions of case 2 a the main chute either fails to open or is deployed improperly and again at 1,200 feet AGL the timing capacitor 30 begins to discharge since battery voltage has been removed from contact 19. At 1,000 feet AGL battery voltage is removed from contact 20 and due to the parachutist's rapid descent the timing capacitor 30 has not sufficiently discharged and therefore causes the firing of the SCR 35 which in turn permits capacitor 27 to detonate the Squib and automatically deploy the reserve chute 103 permitting the chutist to descend and land thereunder.

Figure 6:
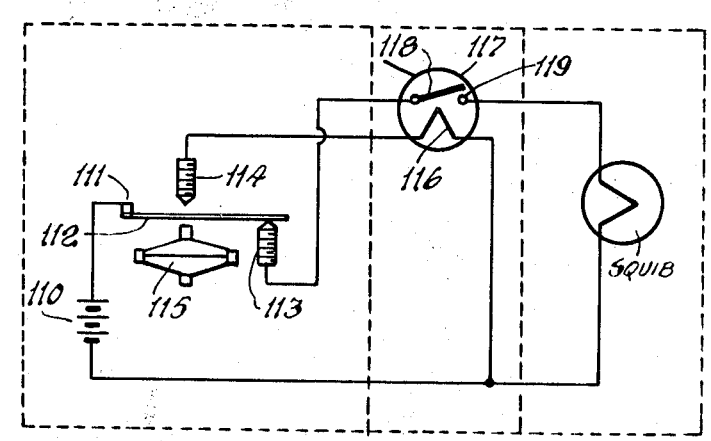
FIG. 6 is a relatively simple embodiment made in accordance with the principles of this invention.

In the illustrated embodiment of FIG. 6 the battery 110 is connected with its positive terminal to the pivot 111 of contact arm 112. Two a stationary contacts are provided, a lower altitude contact 113 disposed below the contact arm and an upper altitude contact 114 located above the arm 112. The bellows 115 is supported so as to engage and move the contact arm upwardly with decreasing pressure or increasing altitude. Contact 114 is connected to the filament or heater 116 of an Amperite Time Delay Relay 117 while the lower contact 113 is applied directly to the arm contact 118 of the normally open relay portion. The stationary contact 119 of the relay 117 is wired to the Squib while the opposite sides of the Squib and the filament are tied to the negative terminal of the battery completing the circuit. The time delay relay operates in a manner such that when the filament is heated, the contact arm is caused to bend (bimetal) and close the circuit. Upon removal of power from the filament the bimetal arm cools and a specific time thereafter opens.

Up to an altitude of 1,000 feet AGL the bellows has been adjusted to allow contact arm 112 to rest on terminal 113 thus applying battery voltage at the movable arm 118 of the relay 117. At 1,200 feet the arm 112 is open for terminal 113 and in contact with terminal 114 supplying filament power closing the relay but, without battery voltage thereat. When the chutist descends and while the filament is still hot (although power has been removed therefrom at 1,200 feet AGL) he passes through the 1,000 foot level, at which moment, arm 112 again contacts terminal 113 applying battery voltage to relay arm 118. If the chutist reaches the 1,000 foot level before the delay relay opens, the Squib will be detonated. This, however, is only possible if his rate of descent exceeds that for the case where his main chute has properly deployed. Under such conditions the Squib will release his reserve chute. Under a slow descent the relay will open, before he descends to 1,000 feet AGL and the unit will be disarmed.

Summarizing, the invention provides an automatic parachute ripcord release, especially suited for sport type parachuting. The unit releases the ripcord on the chutists' reserve chute at a selectable preset altitude AGL and, this is accomplished only if the chutist is falling at a high rate of descent (i.e. main chute not released or malfunctioned). Essentially, the unit determines the rate of descent and, based on this information, decides whether to detonate a charge (Squib) and release the reserve chute at a preset altitude. Such explosive parachute ripcord handles are presently commercially available. One such handle, found suitable, is manufactured by Steve Snyder Enterprises of Swarthmore, Pa.

It should be understood, of course, that the foregoing disclosure relates to only preferred embodiments of the invention and that numerous modifications or alterations may be made therein without departing from the spirit and the scope of the invention as set forth in the appended claims.

I claim:

1. An automatic parachute deployment apparatus comprising:

sensing means for generating a pair of successive electrical output indications, one for each of two selected altitudes;

decision means connected to receive said pair of indications and providing an output therefrom only when the time interval between said indications is less than a selected period, and said indications are received in a particular sequence;

a parachute ripcord release means connected to be activated upon the receipt of said output of said decision means; and whereby when an upper altitude indication is generated and thereafter a lower altitude indication, within said selected period said release means will deploy said parachute.

2. The apparatus according to claim 1 wherein said sensing means includes:

an adjustable aneroid bellows having a movable operating end whose length of travel is proportional to pressure;

a flexible deflecting pivoted electrical contact arm disposed proximate said bellows for movement and deflection by contact with said operating end;

a pair of contacts disposed on the opposite side of said arm from said bellows;

means supporting said contacts for adjustable movement toward and away from said arm; and a source of electrical energy connected to said movable arm, whereby when said bellows is acted upon by a change in pressure it will cause said arm to first contact one of said pair of contacts and upon a further change in pressure it will also contact the other of said pair of contacts and apply said energy source thereto.

3. The apparatus according to claim 2 wherein said source is a battery having one terminal thereof connected to said arm.

4. The apparatus according to claim 3 wherein said decision means includes:

a first electrical unidirectional means;
a second electrical unidirectional means;
a third electrical unidirectional means;
a resistor voltage divider network;
a timing capacitor;
a unijunction transistor having a pair of base contacts and an emitter;
a shunt resistor;
a first loop path having connected in series therein, said one of said pair of contacts, said first unidirectional means, said pair of base contacts, said shunt resistor, the other terminal of said battery;
a second loop path having connected in series therein said one of said pair of contacts, said voltage divider and said other terminal of said battery;
a third series loop path having included therein said other of said pair of contacts, said second unidirectional means, said timing capacitor and said other terminal of said battery;
a variable resistor connected intermediate said divider network and the junction between said capacitor and said second unidirection means;
electrical means connecting said junction connected to said emitter; and
said third unidirectional means electrically connected between said other of said pair of contacts and one of said pair of base contacts.

5. The apparatus according to claim 4 further including:
an input resistor electrically connected between said other of said pair of contacts and said other terminal of said battery; and
an output resistor having one end thereof connected to the other of said pair of base contacts.

6. The apparatus according to claim 5 wherein said unidirectional means are diodes.

7. The apparatus according to claim 6 wherein said ripcord release means includes:

an electrically detonating means having two terminals and carried by a ripcord handle of a parachute for releasing said parachute;

a silicon controlled rectifier having an anode, a cathode and a gate terminal;

said detonating means connected in series with the free end of said output resistor, said anode and cathode of said SCR and said other terminal of said battery;

a firing capacitor connected between said free end of said output resistor and said other terminal of said battery;

an electrical connection between said gate terminal and said one of said pair of base contacts.

8. The apparatus according to claim 7 wherein said detonating means is a "Squib."

9. The apparatus according to claim 8 further including a calibration circuit comprising:

a stationary contact supported in abutting relation with said movable arm when said arm is undeflected;

a pair of series connected lamps having one end thereof electrically connected to said arm and the opposite end thereof connected to said operating end of said bellows;

a calibrating transistor having its collector connected to the junction of said lamps;

a base resistor having one end connected to the base of said calibrating transistor;

a Zener diode connected between the other end of said base resistor and said one terminal of said battery;

a normally open switch having its stationary contacts connected intermediate the emitter of said calibrating transistor and the said other terminal of said battery whereby said bellows may be correctly adjusted at ground level dependent on the lighting of said lamps.

10. The apparatus according to claim 1 wherein said sensing means comprises:

a pressure sensitive transistor having a collector, an emitter, a base and a pressure sensitive terminal;
a battery;
a collector resistor;
a series loop electrical path having therein one terminal said battery, said collector resistor, said collector, said emitter and the other terminal of said battery;
an adjustable variable resistance connected between said one terminal of said battery and said base terminal;
a pair of regenerative bistable networks each having an input and an output terminal and providing an output only when the input thereto exceeds an adjustable level, each of said inputs electrically connected to said collector terminal;
a pair of relays each having a movable contact normally connected to a stationary contact, each of said movable contacts connect to said one terminal of said battery; and
electrical means connecting said output terminal of each of said bistable network to its respective relay, whereby the outputs of said sensing means is provided at said stationary contacts of each of said relays.

11. The apparatus according to claim 10 wherein said regenerative bistable networks are Schmitt Triggers.

12. The apparatus according to claim 11 wherein said release means comprises:

a mechanical means for pulling a ripcord having a restraining portion for preventing pulling of said ripcord;
a solenoid coupled to said restraining portion for removing the same upon activation of the winding of said solenoid;
a silcon controlled rectifier having an anode, cathode and a gate terminal, and having its gate connected to the output of said decision means;
an activating capacitor connected across said battery;
said winding and said anode and cathode of said SCR connected across said battery.

13. The apparatus according to claim 12 wherein said mechanical means includes a coiled spring and said restraining portion is a locking mechanism.

14. An apparatus for automatically deploying a parachute having a ripcord handle, comprising:

an adjustable aneroid bellows having a movable operating end whose length of travel is proportional to pressure;

a flexible deflecting pivoted electrical contact arm disposed proximate said bellows for movement and deflection by contact with said operating end;

a first adjustable contact disposed on one side of said arm;

a second adjustable contact disposed on the opposite side of said arm;

a battery having one terminal connected to said arm;

a time delay relay having a filament heater element and a movable heat sensitive switch element normally open to its stationary contact but when heated closing such contact;

an electrically detonable means carried by the ripcord handle of said parachute for deploying said parachute upon ignition of said detonable means;

a first electrical means connecting in series said first adjustable contact said heater element and the other terminal of said battery;

a second electrical means connecting in series said second adjustable contact, said switch element, said stationary contact, said detonable means, and said other terminal of said battery.

15. The apparatus according to claim 14 wherein said detonable means is a "Squib".